United States Patent
Cha

(10) Patent No.: US 6,833,508 B2
(45) Date of Patent: Dec. 21, 2004

(54) HOLDER FOR LEAD WIRE

(75) Inventor: Hyun-rok Cha, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/436,540

(22) Filed: May 13, 2003

(65) Prior Publication Data

US 2004/0105208 A1 Jun. 3, 2004

(51) Int. Cl.⁷ .................................................. H01B 7/00
(52) U.S. Cl. .................... 174/135; 174/68.1; 174/68.3
(58) Field of Search ........................... 174/135, 68.1, 174/68.3, 65 G; 439/274

(56) References Cited

U.S. PATENT DOCUMENTS

| 2,997,531 | A | * | 8/1961 | Oldham et al. | ......... 174/158 R |
| 4,601,530 | A | * | 7/1986 | Coldren et al. | ............. 439/460 |
| 6,109,456 | A | * | 8/2000 | Heinz | .......................... 211/46 |
| 6,114,629 | A | * | 9/2000 | Roush et al. | ............. 174/65 G |

FOREIGN PATENT DOCUMENTS

| JP | 11-89153 | 3/1999 |
| JP | 09-239337 | 3/1999 |
| JP | 11-089153 | 3/1999 |
| JP | 11-324920 | 11/1999 |

OTHER PUBLICATIONS

Patent Abstracts of Japan Publication No. 11–089153, Date Mar. 3, 1999.

* cited by examiner

*Primary Examiner*—Dhiru R. Patel
(74) *Attorney, Agent, or Firm*—Ladas & Parry LLP

(57) ABSTRACT

Disclosed is a lead wire holding member. In the disclosed invention, the holding member for holding a plurality of lead wires together includes one or more holding plate, each plate having a hole for receiving the plurality of lead wires all together and a slit formed from the hole to the outer edge of the holding plate. Accordingly, lead wires can be easily held together and a holding member that is less costly and easy to work with can be provided.

4 Claims, 5 Drawing Sheets

HOLDER FOR LEAD WIRE

BACKGROUND OF THE INVENTION

1. Field of the Invention

The present invention relates to a cluster assembly of a compressor, and more particularly, to a holder for lead wire of a cluster assembly which has a simple structure and is less costly than prior devices.

2. Description of the Prior Art

FIG. 1 is a partial sectional view showing a compressor with a conventional cluster assembly disposed. In general, a compressor has a structure in which an electrical driving unit 20 and a compression unit (not shown) are disposed inside a sealed case 10 comprising an upper case 11 and a lower case 12 as shown in FIG. 1.

The electrical driving unit 20 powers the compression unit by receiving power from outside. The unit 20 comprises a cylinder block 21 fixed in the lower case 12, a stator 22 fixed on the upper part of the cylinder block 21 and a rotor 23 rotatably disposed inside the stator 22.

Disposed on one side of the lower case 12 are a terminal 30 for supplying external power to the electrical driving unit 20 and a set of terminal pins 31 for providing connection to the external power. The terminal 30 has a cluster assembly 40 connected for transmitting the external power to the electrical driving unit 20.

As shown in FIG. 2, this cluster assembly 40 has a structure in which three lead wires 42a, 43a, 44a are each connected to the electrical driving unit 20 and are connected to a box shaped cluster housing 41 having pin holes 45a, 46a, 47a for receiving the terminal pin 31.

The cluster housing 41 has three channels 45, 46, 47 for receiving contactors 42b, 43b, 44b. Each channel 45, 46, 47 has pin holes 45a, 46a, 47a formed to receive the terminal pins 31. The lead wires 42a, 43a, 44a connected to the electrical driving unit 20 are inserted one by one into the channels 45, 46, 47 and fixed to the contactors 42b, 43b, 44b.

Each lead wire 42a, 43a, 44a is covered with an insulating tube 42c, 43c, 44c for electrical insulation. In addition, these lead wires 42a, 43a, 44a are held together by a holding tube 50 to prevent a short circuit from occurring by contact with other parts inside the sealed case 10 if the lead wires 42a, 43a, 44a are separated from each other.

However, the above conventional holding tube 50 is woven fabric which requires heat processing on both cut ends. Moreover, it is difficult to insert lead wires 42a, 43a, 44a into the tube 50 because it is not hard. Therefore, the conventional holding tube is costly and difficult to work with.

SUMMARY OF THE INVENTION

An object of the invention is to solve at least the above problems and/or disadvantages and to provide at least the advantages described hereinafter.

Accordingly, a specific object of the present invention is to solve the foregoing problems by providing a holder for lead wires that is easily produced by punching process, and is less costly and easy to work with.

The foregoing and other objects and advantages are realized by providing a holding member for holding a plurality of lead wires together comprising one or more holding plate, each plate having a hole for receiving the plurality of lead wires all together and a slit extending from the hole to the outer edge of the holding plate.

In the present invention having the above structure, it is preferable that the holding plates are bendably connected side by side.

The slits of the holding plates are formed on a same side parallel to a connecting portion between the holding plates, or alternatively on an opposite side parallel to the connecting portion.

It is preferable that the holding plate is made of polyester.

BRIEF DESCRIPTION OF THE DRAWINGS

The above objects and features of the present invention will be made more apparent by describing a preferred embodiment of the present invention with reference to the accompanying drawings, in which.

DETAILED DESCRIPTION OF THE PREFERRED EMBODIMENT

Figure 1:
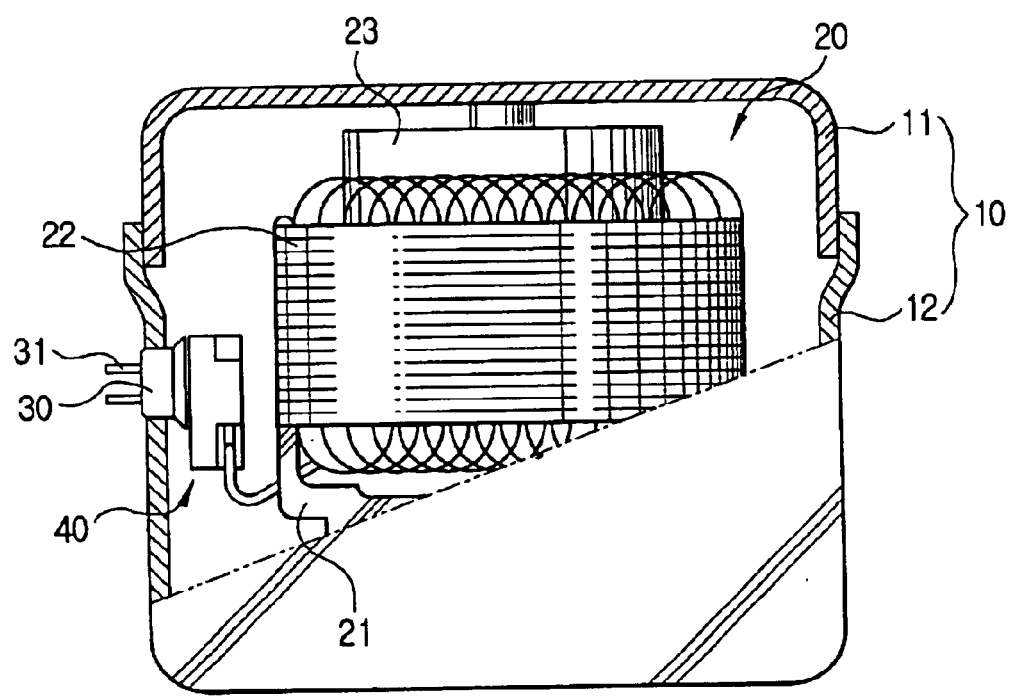
FIG. 1 is a partial sectional view showing a compressor with a conventional cluster disposed.
Figure 2:
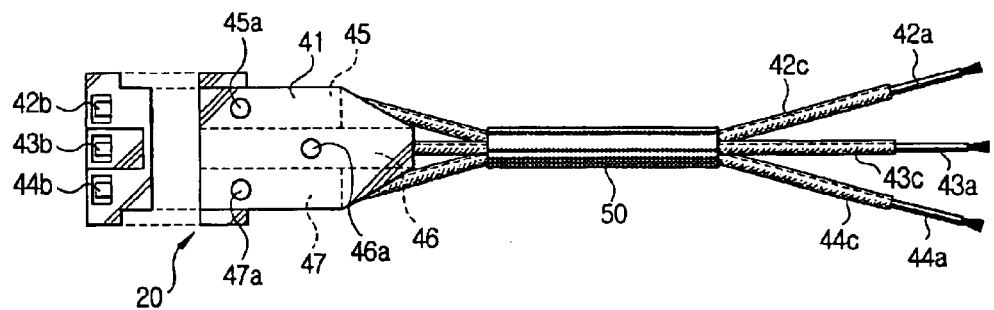
FIG. 2 is a plan view showing a structure of a cluster assembly with a conventional holding tube for lead wires.

Hereinafter, a holding member for lead wires according to a preferred embodiment of the present invention will be described in greater detail with reference to the accompanying drawings. With respect to the elements identical to those of the prior art, like reference numerals will be assigned.

Figure 3:
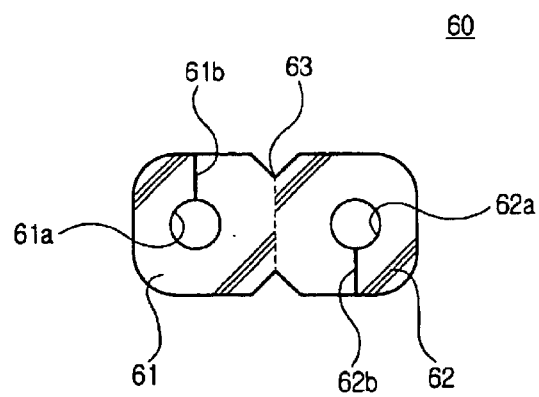
FIG. 3 is a plan view showing a holding member for lead wires according to a preferred embodiment of the present invention.

As shown in FIG. 3, the holding member 60 for lead wires according to the present invention has a structure in which first and second holding plates 61, 62 respectively define first and second holes 61a, 62a, and first and second slits 61b, 62b. These plates 61, 62 are connected side by side.

The first and second holding plates 61, 62 are formed of a thin insulating polyester material that is not easily destroyed by deformation. The member 60 can be manufactured by punching. Provided between the first holding plate 61 and the second holding plate 62 is a bendable portion 63 and accordingly the first and second holding plates 61, 62 can be bent along the bendable portion 63. The bendable portion 63 is thinner than the first and second holding plates 61, 62 thereby being easily bent.

The first and second holes 61a, 62a are formed of a predetermined size large enough to receive a plurality of lead wires 42a, 43a, 44a respectively in the approximate middle of the first and second holding plates 61, 62. The first and second slits 61b, 62b are respectively formed at one side of the first and second holding plates 61, 62 and they extend from the first and second holes 61a, 62a to the outer edge of the first and second holding plates 61, 62. Accordingly, the lead wires 42a, 43a, 44a can be received into the first and second holes 61a, 62a through the first and second slits 61b, 62b.

Hereinafter, the process of holding the lead wires 42a, 43a, 44a of the cluster assembly 40 using the holding member 60 according to the present invention will be described referring to FIGS. 4A and 4B.

Figure 4A:
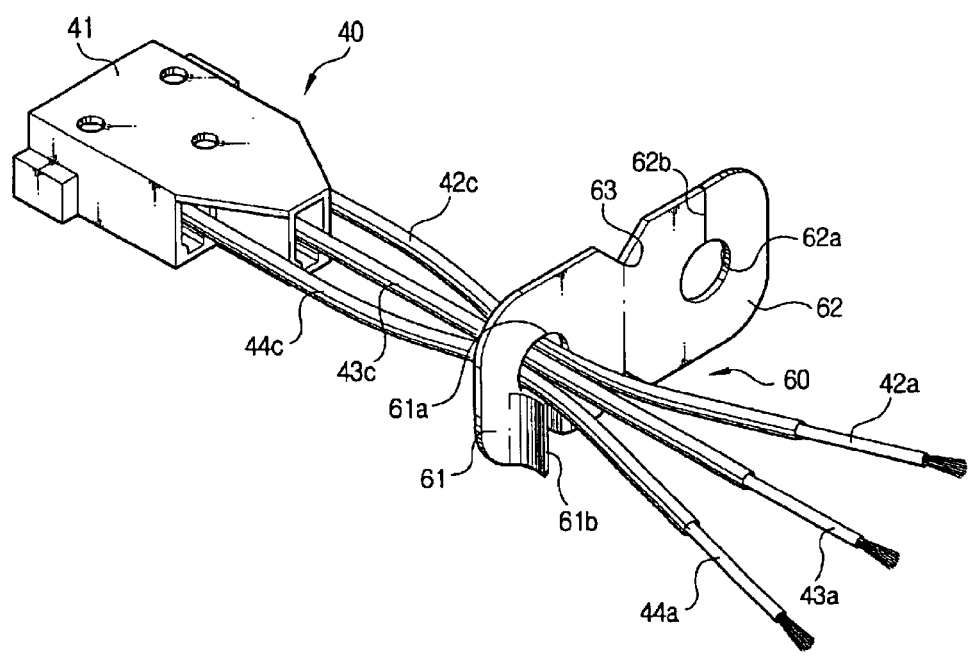
FIGS. 4A and 4B are perspective views showing the process of holding lead wires by using the holding member according to the present invention of FIG. 3.
Figure 4B:
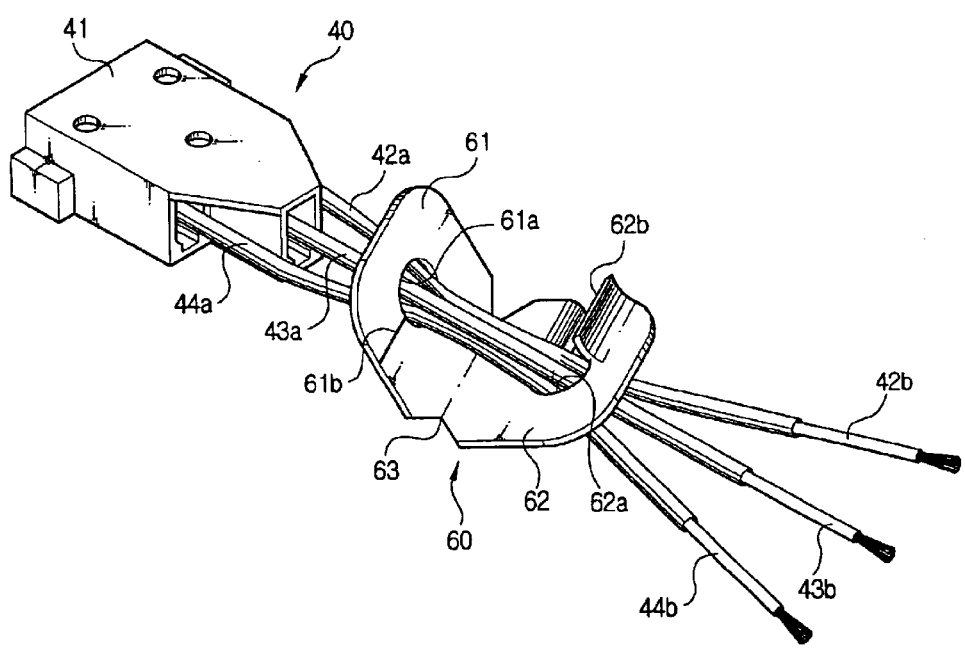

As shown in FIG. 4A, the three lead wires 42a, 43a, 44a covered by the insulating tubes 42c, 43c, 44c and connected to the cluster housing 41 are gathered together and the first slit 61b is opened. The gathered lead wires 42a, 43a, 44a are then inserted into the first hole 61a through the opened first slit 61b. As shown in FIG. 4B, with the three lead wires 42a, 43a, 44a inserted in the first hole 61a, the second holding plate 62 is slightly bent toward the first holding plate 61 and the second slit 62b is opened. The gathered lead wires 42a, 43a, 44a are then inserted in the second hole 62a through the opened second slit 62b. The lead wires 42a, 43a, 44a have a tendency to be gathered together by continuous force of the first and second holding plates 61, 62 tending to be unbent. The first and second slits 61b, 62b of the first and second holding plates 61, 62 stay closed unless acted upon the external force, and therefore the three lead wires 42a, 43a, 44a remain held inside the first and second holes 61a, 62b.

Figure 5A:
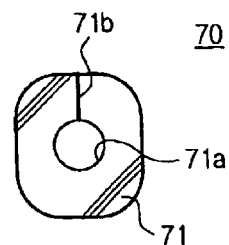
FIGS. 5A though 5C are plan views showing various embodiments of a holding member for lead wires according to the present invention.
Figure 5B:
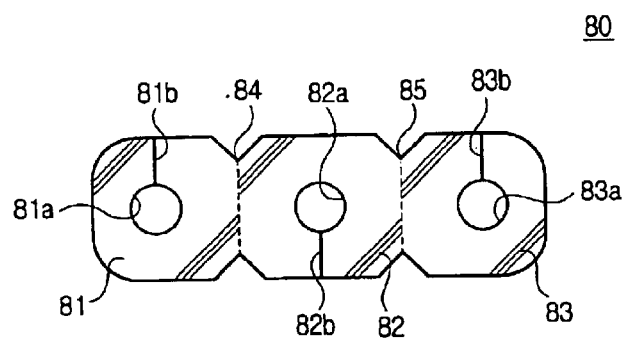
Figure 5C:
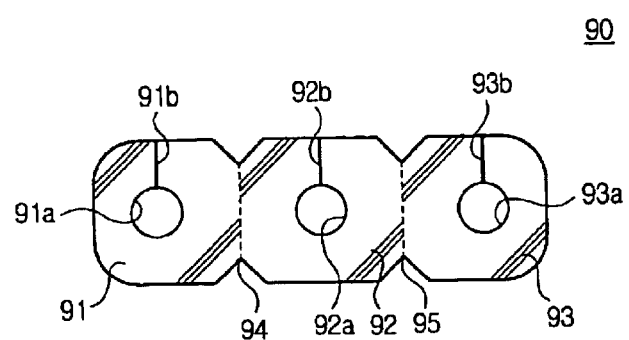

FIGS. 5A, 5B, 5C show holding members 70, 80, 90 according to other embodiments of the present invention.

The holding member 70 shown in FIG. 5A may comprise a single holding plate 71 having a hole 71a and a slit 71b. Such holding member 70 comprising a single holding plate 71 may be conveniently used for holding the lead wires 42a, 43a, 44a (see FIG. 4B) when the lead wires 42a, 43a, 44a are short.

Alternatively, when the lead wires 42a, 43a, 44a are long, the holding member 80 comprising three holding plates 81, 82, 83 respectively having holes 81a, 82a, 83a and slits 81b, 82b, 83b, the holding plates 81, 82, 83 being connected side by side. This member 82 may be used to hold the long lead wires 42a, 43a, 44a without being separated as shown in FIG. 5B. The holding member 80 has the holes 81a, 82a, 83a formed on the holding plates 81, 82, 83 all formed in the approximate middle. However, the slits 81b, 82b, 83b for receiving the lead wires 42a, 43a, 44a into the holes 81a, 82a, 83a are formed alternatively on opposite sides but the slits are parallel to the bendable portion 84, 85. The holding member 90 according to another embodiment of the present invention shown in FIG. 5C comprises three holding plates 91, 92, 93 respectively having holes 91a, 92a, 93a and slits 91b, 92b, 93b connected side by side. This member 90 has the same structure as the holding member 80 shown in FIG. 5B except that the slits 91b, 92b, 93b are formed differently to those of holding member 80. All the slits 91b, 92b, 93b of the holding member 90 are formed on the same side and are parallel to the bendable portion 94, 95 connecting the holding plates 91, 92, 93.

A holding member according to the present invention can comprise a plurality of holding plates 61, each plate having a hole 61a and a slit 61b. The member may comprise four or more holding plates, not limiting the number of holding plates 61 to what is shown in the drawings.

Additionally, although the holding member 60 according to the present invention is here described as a holding member for holding the lead wires 42a, 43a, 44a of the compressor cluster assembly 40 in the above description, the present invention is not limited in its use and may be applied to various devices having a plurality of lead wires.

According to the present invention described above, a plurality of lead wires can be held together by a simple and thin plate shape holding member defining a hole for receiving the lead wires and a slit for inserting the lead wires into the hole. Therefore, a holding member that is less costly and convenient to work with can be provided.

The foregoing embodiments and advantages are merely exemplary and are not to be construed as limiting the present invention. The present teaching can be readily applied to other types of devices. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A holding member for holding together a plurality of lead wires, the holding member comprising a plurality of holding plates connected together in serial array at connecting portions disposed at the juncture of two adjacent plates, at least two of the holding plates each defining a hole adapted to receive and hold together the plurality of lead wires, each of said holding plates further defining a slit formed from said hole to an outer edge of said holding plate, wherein said slits of the holding members are each formed on the same side of each plate and the connecting portions between the plates enable the plates to be folded at an angle relative to each other, so that the slits extend parallel to the connecting portion between the holding plates.

2. The holding member according to claim 1, wherein the holding member is made of polyester.

3. A holding member for holding together a plurality of lead wires, the holding member comprising a plurality of holding plates connected together in serial array at connecting portions disposed at the juncture of two adjacent plates, at least two of the holding plates each defining a hole adapted to receive and hold together the plurality of lead wires, each of said holding plates further defining a slit formed from said hole to an outer edge of said holding plate, wherein said slits of the holding plates are each formed alternatively on opposite sides of adjacent plates and the connecting portions between the plates enable the plates to be folded at an angle relative to each other, so that the slits extend parallel to the connecting portion between the holding plates.

4. The holding member according to claim 3, wherein the holding member is made of polyester.

* * * * *